United States Patent [19]

Wells et al.

[11] 4,433,544

[45] Feb. 28, 1984

[54] WIND AND SOLAR POWERED TURBINE

[75] Inventors: Ivan D. Wells, Hesperia; Jin L. Koh, Loma Linda; Marvin Holmes, Monrovia, all of Calif.

[73] Assignee: The United States of America as represented by the Administrator of the National Aeronautics and Space Administration, Washington, D.C.

[21] Appl. No.: 379,602

[22] Filed: May 19, 1982

[51] Int. Cl.³ .................... F03G 7/02; F03G 7/04; F01B 21/04; F01K 23/00
[52] U.S. Cl. ........................... 60/641.12; 60/698; 60/716; 290/55; 415/2 R; 415/DIG. 8
[58] Field of Search .............. 60/641.8, 641.11, 641.12, 60/698, 716; 290/54, 55, 44; 415/2 R, 2 A, 3, 4, DIG. 8

[56] References Cited

U.S. PATENT DOCUMENTS

| | | | |
|---|---|---|---|
| 2,431,111 | 11/1947 | Du Brie. | |
| 2,911,541 | 11/1959 | Neufville et al. | 290/55 |
| 3,048,006 | 8/1962 | Goodman | 60/641.12 |
| 3,721,290 | 3/1973 | Butler, Jr. | 290/44 |
| 3,743,848 | 7/1973 | Strickland | 290/55 |
| 3,902,072 | 8/1975 | Quinn. | |
| 3,936,652 | 2/1976 | Levine. | |
| 3,979,597 | 9/1976 | Drucker. | |
| 4,002,032 | 1/1977 | Bash. | |
| 4,004,427 | 1/1977 | Butler, Jr. | 60/698 |
| 4,018,543 | 4/1977 | Carson et al. | 290/55 |
| 4,079,264 | 3/1978 | Cohen. | |
| 4,118,636 | 10/1978 | Christian | 60/641.12 |
| 4,122,675 | 10/1978 | Polyak. | |
| 4,134,707 | 1/1979 | Ewers. | |
| 4,164,382 | 8/1979 | Mysels. | |
| 4,224,528 | 9/1980 | Argo | 415/2 R |
| 4,275,309 | 6/1981 | Lucier | 290/55 |

FOREIGN PATENT DOCUMENTS

| | | | |
|---|---|---|---|
| 164912 | 4/1954 | Australia | 60/641.12 |
| 530634 | 12/1921 | France | 415/2 R |
| 2436268 | 5/1980 | France | 60/641.11 |
| 1025 | of 1905 | United Kingdom | 415/2 A |
| 1231581 | 5/1971 | United Kingdom | 415/2 A |
| 2081390 | 2/1982 | United Kingdom | 415/2 R |

*Primary Examiner*—William R. Cline
*Assistant Examiner*—John K. Ford
*Attorney, Agent, or Firm*—Paul F. McCaul; Thomas H. Jones; John R. Manning

[57] ABSTRACT

A power generating station (20) having a generator (28) driven by solar heat assisted ambient wind is disclosed. A first plurality of radially extending air passages (32) direct ambient wind to a radial flow wind turbine (34) disposed in a centrally located opening (46) in a substantially disc-shaped structure (21). A solar radiation collecting surface having black bodies (40) is disposed above the first plurality of air passages (32) and in communication with a second plurality of radial air passages (44).

A cover plate (50) enclosing the second plurality of radial air passages (44) is transparent so as to permit solar radiation to effectively reach the black bodies (40). The second plurality of air passages (44) direct ambient wind and thermal updrafts generated by the black bodies (40) to an axial flow turbine (48) which also derives additional motive power from the air mass exhausted by the radial flow turbine (34). The rotating shaft (26) of the turbines (34) (48) drive the generator (28). The solar and wind driven power generating system operates in electrical cogeneration mode with a fuel powered prime mover (56). The system is particularly adapted to satisfy the power requirements of a relatively small community located in a geographic area having favorable climatic conditions for wind and solar powered power generation.

20 Claims, 7 Drawing Figures

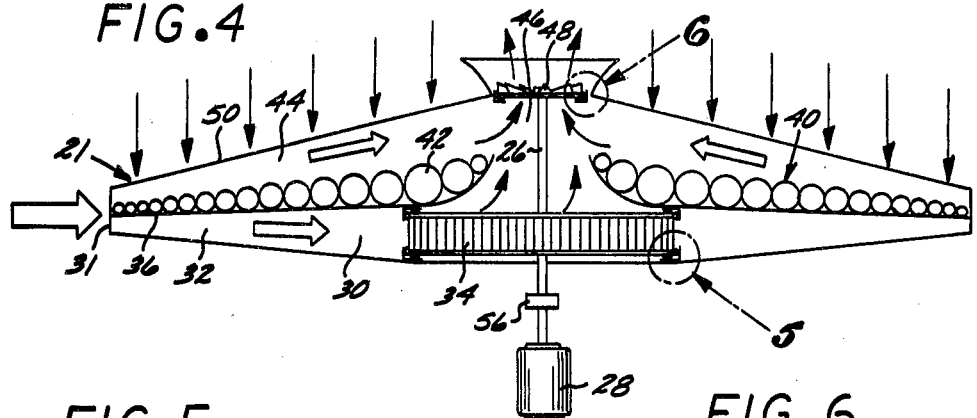
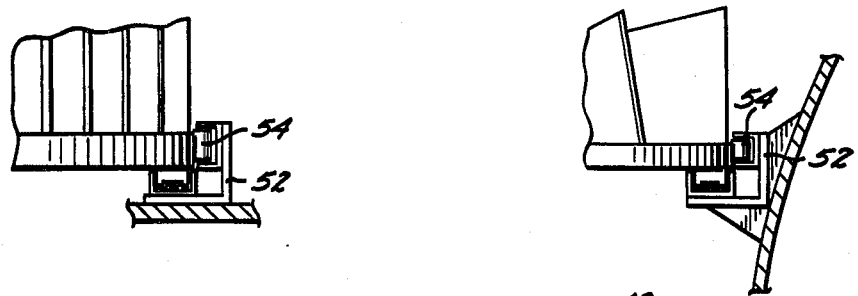
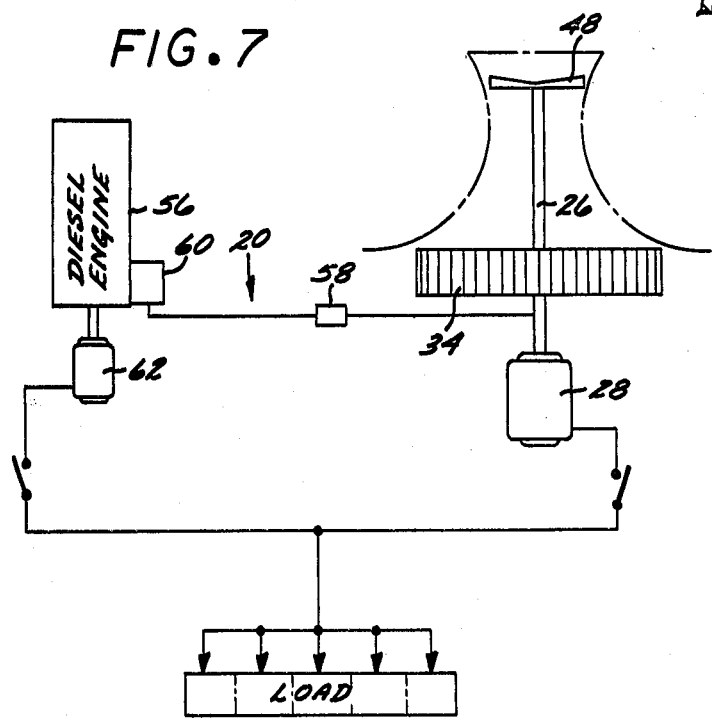

WIND AND SOLAR POWERED TURBINE

BACKGROUND OF THE INVENTION

1. Origin of the Invention

The invention described herein was made in the performance of work under a NASA Contract and is subject to the provisions of Section 305 of the National Aeronautics and Space Act of 1958, Public Law 85-568 (72 STAT 435; 43 USC 2457).

2. Field of the Invention

The present invention is directed to the field of solar and wind energy harnessing devices. More particularly, the present invention is directed to a combination wind and solar energy harnessing device which is particularly adapted for supplying power needs of relatively small communities in remote locations.

3. Brief Description of the Prior Art

Solar collectors adapted for absorbing the radiant energy of solar rays have been known in the art for a long time. Some solar collectors of the prior art use parabolic or like mirrors to concentrate the radiant energy of the sun for the purpose of generating hot water or steam for space heating or electrical power generating applications. Another class of solar collectors utilize a black body for absorbing the radiant energy of solar rays and to convert said energy to a useable form of thermal energy.

Windmills, wind driven turbines and the like have also been known for a long time. Mankind's awareness of the ability of the ambient wind to provide useful energy in the form of rotary shaft power is exemplified in the ancient art of constructing windmills to drive various (usually primitive) forms of machinery. Principally during the twentieth century, and particularly recently, developments in the fields of aerodynamics have led to wind turbine or wind propeller designs which are highly improved and vastly more efficient for extracting rotary shaft power from a moving mass of air, than the ancient windmill type blades.

Generally speaking, present day wind turbines can be classified as radial flow turbines and axial flow turbines. In a radial flow turbine the airflow is substantially perpendicular to the axis of rotation of the turbine, while in an axial flow turbine the airflow is substantially parallel with the axis of rotation of the turbine.

Since wind is a substantially horizontal movement of the ambient air mass, a radial flow wind turbine can also be termed a vertical axis wind turbine, and an axial flow turbine can also be termed a horizontal axis wind turbine. As it will be readily appreciated by those skilled in the art, because of the practically continuously changing nature of wind direction, in order to attain acceptable efficiency an axial flow wind turbine must continuously be aligned to face the wind. In case of relatively large axial flow wind turbines the above-noted requirement can be satisfied only at relatively high cost of construction. This is because the relatively heavy turbine designed to be capable of rotating at a high speed on a horizontal axis, must be mounted to be also pivotable on a vertical axis.

Radial flow or vertical axis wind turbines, on the other hand, are capable of producing rotary power independently of the wind direction. However, in radial flow turbines, the construction of the blades must be such that lift forces acting on a leeward blade must not counteract the lift forces on the windward blade. These and other engineering problems, such as continuously changing torque as the angle of attack of the rotating blades continuously changes relative to the wind, have recently been overcome by highly sophisticated blade design engineering, and by constructing sufficiently large turbines so that the windstream does not emit through to the leeward blade.

For further information relating to wind turbines and the like, reference is made to U.S. Pat. Nos. 2,431,111; 4,134,707; 4,164,382; 2,911,541; 3,902,072; 4,079,264; 4,018,543; and 3,743,848. U.S. Pat. No. 3,743,848 is of particular interest to the present invention because it describes a wind driven power generating apparatus coupled to an auxiliary engine to supplement the power produced by the wind.

In addition to the above-noted separate wind and solar energy harnessing devices, the prior art has also suggested devices wherein thermally-induced updrafts or thermal air currents are harnessed by a wind turbine. In other words, in certain prior art devices, heat developed by absorption of solar radiation is utilized either to create a thermal updraft, or to accelerate the flow of ambient wind which is harnessed by a wind turbine. Such devices are described in U.S. Pat. Nos. 4,224,528; 4,275,309; 3,936,652; 3,979,597; 4,118,636; 4,002,032; and 4,122,675.

However, in spite of the relative abundance of disclosures in the patent literature relating to solar heated or solar assisted wind turbine driven power generating devices, practical utilization of such devices is not widespread. This is perhaps principally due to the fact that the specific structures utilized by the prior art are not well adapted or engineered for efficient power generation at an acceptable cost. Nevertheless, the prior art correctly recognized the potential for power generation by simultaneous harnessing of solar radiation and ambient wind.

In light of the foregoing, a need exists in the prior art for a power generating station which efficiently utilizes ambient solar and wind energy for electrical power generation. There is particularly a need in the art for a solar and wind driven power generating station, which, in conjunction with an auxiliary fossil fuel burning engine, is adapted for economically supplying the power needs of a relatively small community, particularly in remote regions where conventional electrical power is unavailable.

SUMMARY OF THE INVENTION

It is an object of the present invention to provide a power generating station which is efficiently driven by ambient wind and solar heat.

It is another object of the present invention to provide a solar heat and ambient wind driven power generating station which is relatively economical to construct and operate.

It is still another object of the present invention to provide a relatively economical ambient wind and solar heat driven power generating station, which is capable of relatively economically supplying the power needs of small communities, particularly in remote regions.

These and other objects and advantages are attained by a power generating station which has a first plurality of radially extending air passages directing ambient wind to a radial flow wind turbine. A solar radiation collecting surface is disposed above the first plurality of air passages. Ambient wind, after having passed through the radial flow turbine, is directed to an axial flow turbine.

A second plurality of radially extending air passages is disposed above the solar radiation collecting surface. The second plurality of air passages directs the ambient wind to the axial flow turbine. At least a top member of the structure defining the second plurality of air passages is transparent to short wave components of solar radiation so that the collecting surface is exposed to solar rays. The collecting surface heats the mass of ambient air as it passes over the collecting surface, thereby increasing its velocity, and ultimately imparting additional motive power to the axial flow turbine. In a like manner, thermal updrafts generated by the collecting surface impart their motive power to the axial flow turbine. The axial and radial flow turbines drive an electrical generator.

The solar and wind driven turbines are preferably used in association with a fossil fuel burning prime mover, such as a diesel engine. The prime mover, through a sensing device, is supplied with fuel to the extent necessary to supplement the power output of the turbines to adequately provide for the momentarily existing power requirements despite fluctuations in the requirements, the velocity of ambient wind and the intensity of solar radiation.

The features of the present invention can be best understood, together with further objects and advantages, by reference to the following description, taken in connection with the accompanying drawings wherein like numerals indicate like parts.

BRIEF DESCRIPTION OF THE DRAWINGS

FIG. 4 is a highly schematic cross-sectional view, the cross-section being taken on a substantially vertical plane;

FIG. 5 is a schematic enlarged view taken from FIG. 4;

FIG. 6 is another schematic enlarged view taken from FIG. 4, and

FIG. 7 is a highly schematic view showing the wind and solar driven power generating station coupled to a diesel engine for supplementing the usually fluctuating power output of the turbines of the station.

DESCRIPTION OF THE PREFERRED EMBODIMENT

The following specification, taken in connection with the drawings, sets forth the preferred embodiment of the present invention in such a manner that any person skilled in the solar energy collecting devices and turbine designing arts can use the invention. The embodiment of the invention disclosed herein is the best mode contemplated by the inventors for carrying out their invention in a commercial environment, although it should be understood that various modifications can be accomplished within the parameters of the present invention.

Figure 1:
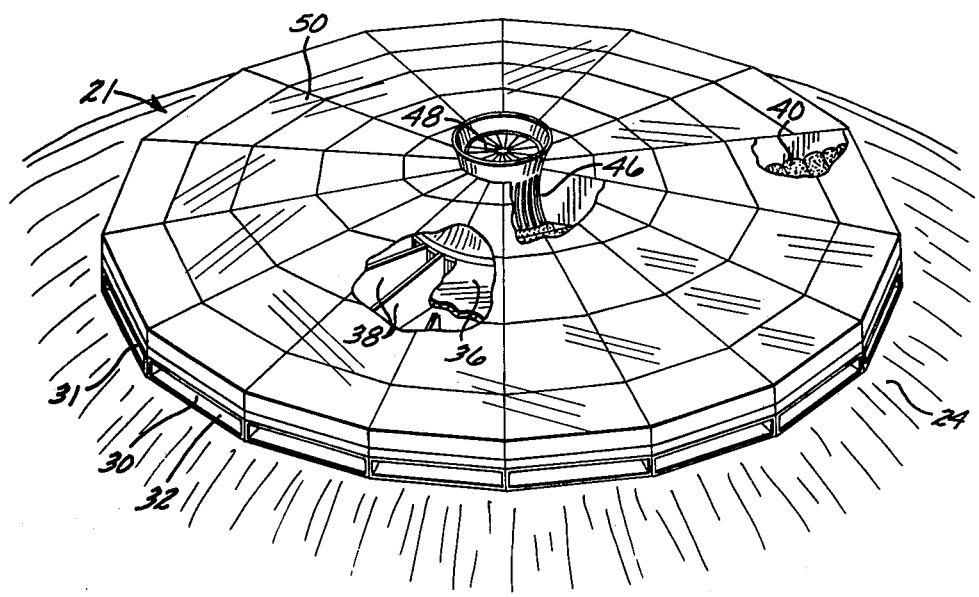
FIG. 1 is a schematic perspective view of the solar and ambient wind driven power generating station of the present invention, with portions of a transparent cover plate being broken away.
Figure 2:
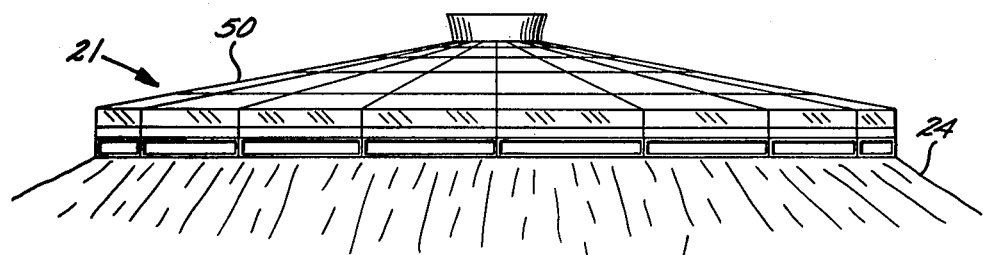
FIG. 2 is a schematic, partial side view of the power generating station.
Figure 3:
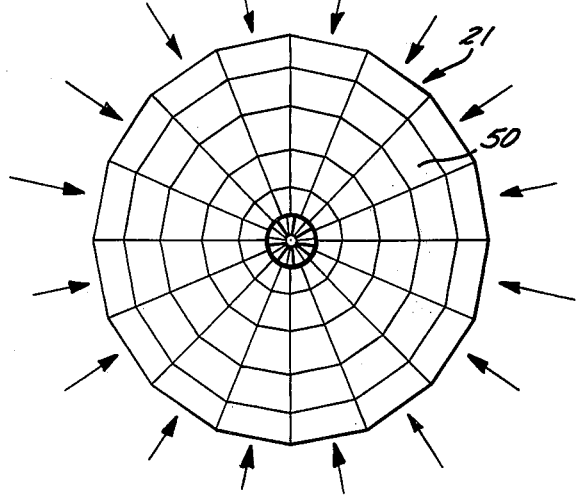
FIG. 3 is a highly schematic top view of the power generating station.

Referring now to the drawing figures, and particularly to FIGS. 1 and 4, the preferred embodiment of the solar and wind powered generating station is disclosed.

The generating station is a large substantially disk-shaped structure 21 which is located in a geographical area wherein there is relatively strong and frequent wind preferably coupled with abundant sunshine. There are many areas in the world having the above-noted prevailing weather conditions; for example, many locations in mountainous and desert areas, islands in the oceans with strong trade winds, and certain locations in the North American Midwest have these weather characteristics.

Generally speaking, the solar and wind driven power generating station of the present invention is contemplated to be efficient and economical to operate in areas where the average wind velocity is approximately 25 Kmph (15.5 mph). Furthermore, it is noted that the wind and solar powered generating station of the present invention is contemplated to be particularly efficient and economical to operate at locations remote from urban or industrial centers, where conventionally generated power from large power plants is usually not available, and where the electrical power requirements of only a relatively small community need to be met. As is well known, such locations often are in desert or mountainous areas or islands, where, as noted above, the annual average wind velocity reaches or exceeds 25 Kmph.

In order to take advantage of generally higher wind velocities at elevated locations relative to the average ground level of the site of the power generating station, the disc-shaped structure 21 is preferably mounted on top of a small hill 24, or on top of a building (not shown). A substantially vertically disposed rotating shaft 26 of the station and an electrical power generator 28 driven by the shaft 26, is housed underground or in the building, as applicable. It should be specifically understood in this regard that the precise mode of supporting the substantially disc-shaped structure 21 and housing for the generator 28 is not critical in the practice of the present invention, although cantilevered support of the disc-shaped structure 21 is preferably avoided to save cost of construction.

The disc-shaped structure 21 is divided into two compartments. A lower compartment 30 comprises a plurality of air passages or air tunnels 32 which radially extend from a center of the disc-shaped structure 21 to its periphery 31. Since each air passage or air tunnel 32 is open at the periphery 31 of the structure 21, ambient wind penetrates the air passages 32 regardless of the direction of the wind. As is described in more detail below, the wind is directed by the air passages 32 to drive a radial flow turbine 34, which is located in the lower compartment 30 substantially in the center of the structure 21.

A plate or like structural member 36 comprises the upper boundary of the lower compartment 30. The several air passages or air tunnels 32 in the lower compartment 30 are formed by a plurality of radially extending ribs 38. The principal function of the ribs 38 is to provide sufficient strength to the structure 21, which is quite large, approximately thirty-five (35) to eighty (80) feet in radius, or larger.

The plate 36 which comprises the upper boundary of the lower compartment 30 extends from the periphery 31 of the structure 21 inwardly slightly beyond the circumference of the radial flow turbine 34, where it curves in an upwardly direction as is shown on FIG. 4.

A black body 40 is supported by the plate 36. The purpose of the black body 40 is to act as a collector of solar radiation, and as a short term store of thermal energy derived from the absorbed solar rays. It is noted in this regard, that the term "black body" is used in the present description as a term of art denoting bodies or structure specially designed for, or by their nature naturally adapted for relatively efficient collection of solar radiation. For example, the black bodies 40, i.e., the structure supported by the plate 36, may comprise flat plate solar collectors similar to the ones utilized in solar water heating devices. Alternatively, the black body may comprise a layer of black or dark rock (not shown) or other black or dark materials. It is particularly advantageous to employ, pursuant to the present invention, a plurality of used rubber tires 42 as the black body 40. The rubber tires 42 act relatively efficiently for trapping and storing thermal energy derived from solar radiation, and are quite inexpensive. In fact, utilizing used rubber tires as the black body 40 in the power generating stations of the present invention helps to alleviate an otherwise serious waste disposal problem.

A second plurality of air passages 44 are disposed above the black body 40. The second plurality of air passages 44 are similar in construction to the first plurality of air passages 32. Thus, they extend substantially radially from a central opening or channel 46 to the periphery 31 of the disc-shaped structure 21. On the periphery 31 of the disc-shaped structure, the passages 44 are exposed to the ambient wind, and channel the wind inwardly and slightly upwardly towards an axial flow turbine 48 which is mounted substantially at the upper end of the central opening 46.

It is an important feature of the present invention that a top or cover plate 50 which covers the second plurality of air passages 44 is made of a material transparent to short wave solar radiation, but preferably impervious to infrared or heat radiation. Thus, the cover plate 50 is typically made of glass panels, alternatively it may be made of certain plastic materials having the above-noted characteristics. For example, the cover plate 50 may be made of panels of a transparent polyester material well known in the art under the trade name MYLAR. The space between the cover plate 50 and the plate 36 enclosing the lower, first plurality of air passages 32 is divided into the second plurality of air passages 44 by the same structural ribs 38 which comprise the walls of the lower, first plurality of air passages 44. Alternatively, a second set of ribs may be used. As it was noted above, the principal purpose of the ribs 38 is to provide structural integrity to the disc-shaped structure 21, which, especially in times of high winds, is subjected to considerable stress.

Referring now principally to FIGS. 4, 5 and 6, construction of the radial flow and axial flow turbines 34 and 48, and operation of the structure is explained. As is shown in FIG. 4, both turbines 34 and 48 are mounted on a substantially vertically disposed rotating axis 26. In the herein shown preferred embodiment, both turbines 34 and 48 are mounted on the same shaft 26. The radial flow turbine is exposed to moving air mass, or ambient wind, which travels through the first plurality of air passages 32. As it was explained in the introductory section of the present application for patent, the radial flow turbine 34, by virtue of its construction, is insensitive to wind direction. In other words, the radial flow turbine 34 incorporated in the power generating station is driven by ambient wind regardless of direction of the wind. In accordance with established practice in the art, the radial flow turbine is designed in such a manner that the air stream does not emit from the upwind blades of the turbine 34 to the leeward blades, so that the turbine is turned efficiently by the air stream.

The air stream from which the principal amount of kinetic energy has been extracted by the radial flow turbine 34, is channeled in an upwardly direction in the central opening 46 from the radial flow turbine 34 towards the axial flow turbine 48.

The axial flow turbine 48 is driven principally by ambient wind which is directed to it by the second plurality of slightly upwardly inclined air passages 44. It should be noted in this regard, that the axial flow turbine 48, as incorporated in the present invention, is also substantially insensitive to ambient wind direction. When there is ambient sunshine the air mass moving in the second plurality of air passages 44 is further accelerated because it is directly heated by incident solar rays and by the underlying black body 40. Under relatively windless but sunny conditions, the black body is in and of itself capable of generating thermal updrafts which drive the axial flow turbine 48. The axial flow turbine 48 also extracts further energy from the air mass that had passed through the radial flow turbine 34.

The axial flow turbine 48 may be of the propeller or air screw type construction which is well established in the art. Alternatively, and pursuant to relatively recent development in the art, the axial flow turbine 48 may be of the "Sweeney windmill" or "Princeton sail" type. As is known in the art, the terms "Sweeney windmill" or "Princeton sail" refer to modern double membrane, adjustable blade type windmill construction which offers thickness and camber at a relatively light weight and has a favorable lift to drag ratio.

In order to further permit relatively light weight construction of the turbines 34 and 48, the turbines ride in guard rails 52 or suitable roller bearings 54, as is shown on the enlarged views of FIGS. 5 and 6. FIG. 5 shows the guard rail construction for the radial flow turbine 34, and FIG. 6 show the guard rail construction for the axial flow turbine 48. As it will be readily appreciated by those skilled in the art, the guard rails 52 absorb some of the centrifugal and bending forces which are generated in the rapidly turning turbines, and therefore permit less heavy and more efficient blade construction.

Referring now again principally to FIG. 4, the rotating common shaft 26 of the radial flow and axial flow turbines 34 and 48 is shown to be connected to the electrical generator 28 through a gearbox 56. The gearbox 56 accomplishes a fixed ratio speed reduction or speed increase, which may be necessary, depending on the actual turbine design, in order to efficiently drive the generator 28.

In order to prevent the axial flow turbine 48 from becoming a fan producing considerable drag when there is no significant solar generated contribution to the air flow in the second plurality of air passages 44, in the herein-described preferred embodiment, the turbine design is such that at any given ambient wind velocity the axial flow turbine 48 is driven as fast or faster than the radial flow turbine 34.

In alternative embodiments, a clutch assembly (not shown) may be incorporated between the respective shafts of the two turbines 34 and 48. Generally speaking, various types of clutch and mechanical power transmission assemblies are possible, and may become desirable in various embodiments of the present invention. For example, a clutch mechanism may be used to connect the rotating shaft of the axial flow turbine 48 with the rotating shaft of the radial flow turbine 34 only when the rotation of the axial flow turbine 34 reaches a predetermined minimum velocity.

Referring now to FIG. 7, cogeneration of electric power by the solar and wind-driven power generating station and a fossil fuel powered prime mover is shown schematically. As it was noted above, the power generating station 20 of the present invention is adapted, in combination with an auxiliary fossil fuel powered prime mover, such as a diesel engine 56, to provide the electrical power requirements of a community in a remote location. To accomplish this purpose, in view of the well-known variations in weather, total reliance cannot be had on wind and solar power alone. This is usually true even in geographical areas where, on a time average basis, combined wind and solar power harnessed by the generating station of the present invention is sufficient to provide sufficiently all the electrical power requirements.

Therefore, as is shown in FIG. 7, a speed sensor 58, or preferably a speed and electrical load sensor is operatively connected to the generator 28. The sensor 58 senses the electric output of the generator 28 and compares it to the load requirement to generate a signal which is proportional to the momentary deficiency of the output of the solar and wind-driven generator 28. The signal is then utilized to control the speed or fuel supply control 60 of the diesel engine 56. The diesel engine 56 drives a second generator 62, and is utilized only to the extent necessary to make up for the deficiency of the power output of the first generator 28 in light of momentary wind and solar fluctuations and electrical power requirements. Alternatively, the diesel engine 56 may be supplied with sufficient fuel so that a combined power output of the two generators 28 and 62 is always maintained at a minimum predetermined level.

Regarding the amount of energy which may be derived from the solar and wind-powered power generating station of the present invention, the following is noted. The generating station is designed to be quite large, for example, to have a surface area exposed to solar radiation in the one-acre to four-acre range. Stated in another way, the radius of the disc-shaped structure may vary approximately in the 35-foot to 80-foot range, although still larger structures are also contemplated within the scope of the present invention.

In a structure of typical size constructed in accordance with the present invention, the air passages 32 wherethrough ambient wind reaches the radial flow turbine 34 in any given fixed wind direction, approximately correspond to a tunnel of 31 m (100 feet)$\times$4 m (13 feet)$\times$12 m (40 feet). Thus, the effective air tunnel has a cross-section of 48 m$^2$. In a tunnel of this size, speed and energy loss due to friction with the walls is minimal (approximately one percent). Air moving with a velocity of 25 Kmh (15.5 mph) through the tunnel of 48 m$^2$ (500 square feet) cross-section, represents, in each second, a kinetic energy output of approximately 12.6 horsepower (Hp).

On the basis of engineering calculations (Lapin Pc equation), the radial flow turbine 34 harnesses about sixty-seven (67) percent of the kinetic energy of the air mass, and the generator 28 transforms the harnessed kinetic energy into electrical energy with an approximately eighty (80) percent efficiency. Thus in a 25 Kmh wind, the radial flow turbine 34 incorporated in the present invention provides approximately 6.6 hp useful electrical energy output.

Considering an effective "air tunnel" of the same size for the axial flow turbine 48 as for the radial flow turbine 34, the same wind velocity, a conservative forty (40) percent efficiency of the axial flow turbine 48, an eighty (80) percent efficiency of mechanical to electrical power conversion, and an 18.6 percent increase in air mass velocity due to solar heating of an approximately one-acre solar rays collecting surface, the axial flow turbine 48 is calculated to contribute approximately 6.2 hp of useable electrical energy. The calculations leading to this result postulate a very realistic 1325 Btu/ft$^2$ per day (thirteen hundred and twenty-five British thermal unit per square foot per day) solar radiation, which is supported by relevant weather bureau statistics.

Thus the total average power output of the solar and wind-driven power generating station of the present invention, having an approximately one (1) acre solar ray absorbing surface, is approximately 12.8 Hp. This is in the absence of cogeneration with a fossil fuel powered prime mover. The above-summarized calculations indicate that the power generating system of the present invention is a highly valuable power source.

Several modifications of the power generating system of the present invention may become apparent to those skilled in the art in light of the above disclosure. Therefore the scope of the present invention should be interpreted solely from the following claims when read in light of the teaching of the specification in view of the prior art.

What is claimed is:

1. A combination wind and solar powered generating station to produce energy comprising:
    a first plurality of radial air passage means adapted for receiving ambient wind, for providing a first source of air and for directing said air to a first predetermined location;
    a second plurality of radial air passage means also adapted for receiving ambient wind for providing a second source of air and for directing said air to a second predetermined location;
    means for collecting radiant solar energy in the form of thermal energy and for communicating said thermal energy with the second air passage means, thereby heating said air moving in the second plurality of air passage means;
    first power means communicating with the first predetermined location for extracting energy from the first source of air, and
    second power means communicating with the second predetermined location for extracting energy from the second source of air and also for extracting further energy from the first source of air.

2. The invention of claim 1 wherein the first power means include a radial flow turbine.

3. The invention of claim 2 wherein the second power means include an axial flow turbine.

4. The invention of claim 3 further including a generator operatively connected to both turbines.

5. The invention of claim 1 further including an auxiliary power source operatively interconnected with the first and second power means for supplementing the cumulative energy output of the first and second power means and for maintaining a minimum level of generated power output independently of variations in the cumulative energy output of the first and second power means.

6. The invention of claim 1 wherein the first plurality of air passage means comprise a first plurality of air ducts extending radially outwardly from a central first predetermined location.

7. The invention of claim 6 wherein the second air passage means include a second plurality of air ducts extending radially outwardly from a central second predetermined location.

8. The invention of claim 7 wherein the means for collecting radiant solar energy are positioned between the first and second plurality of air ducts and the second plurality of air ducts are relatively transmissive to the incident solar radiation to expose said means for collecting said solar radiation, and wherein said means for collecting are adapted for generating thermal air currents, thereby directing further air to the second predetermined location.

9. An improved combination wind and solar powered power generating station comprising:
   a first series of radial air passages disposed approximately horizontally for directing ambient wind to a first predetermined position;
   a second series of radial air passages positioned above the first series of air passages for directing ambient wind to a second predetermined position;
   collecting means for solar energy positioned between the first and second series of radial air passages and communicating with the second series for providing thermal air currents to the second predetermined position;
   first power means communicating with the first predetermined position and extracting energy from the ambient wind directed to the first predetermined position, said first power means directing exhausted ambient wind to the second predetermined position;
   second power means communicating with the second predetermined position for extracting energy from the ambient wind directed to the second predetermined position, for extracting energy from said thermal currents, and from the exhausted ambient wind directed to the second predetermined position by the second power means.

10. The invention of claim 9 wherein the first predetermined position is a first upwardly directed opening located substantially centrally relative to the first series of radial air passages, and the first power means comprise a radial flow turbine disposed in the first opening, and wherein the second predetermined position is a second upwardly directed opening located substantially centrally relative to the second series of radial air passages and substantially concentrically with the first opening and the second power means comprise an axial flow turbine disposed in the second opening.

11. The invention of claim 10 wherein the radial flow turbine and the axial flow turbine are concentrically mounted on a rotatable shaft, and wherein the first and second power means further comprise a generator connected to and driven by said shaft.

12. The invention of claim 10 further comprising a wall separating the first and second series of radial air passages from one another, wherein the collecting means are disposed over said separating wall and comprise a black body adapted for relatively efficiently absorbing solar radiation, and wherein the second series of radial air passages are sufficiently transparent for permitting solar radiation to effectively reach said collecting means.

13. The invention of claim 12 wherein the first and second series of radial air passages comprise a structure of substantially circular horizontal cross-section, and wherein the radius of the structure is approximately between 35 to 80 feet.

14. An improved wind and solar powered power generating station comprising:
   a substantially horizontally disposed substantially disc-shaped structure including a lower compartment and an upper compartment, and a black body disposed between the lower compartment and the upper compartment;
   a first plurality of air passages located in the lower compartment of the structure and extending radially in the disc-shaped structure, said first plurality of air passages being open at the edge of the disc-shaped structure to communicate with the ambient wind and also being open substantially in the center of the structure to communicate with an upwardly directed central opening therein;
   a second plurality of air passages located in the upper compartment of the structure and extending radially in the disc-shaped structure, said second plurality of air passages being open at the edge of the disc-shaped structure to communicate with the ambient wind, and also being open substantially in the center of the structure to communicate with the upwardly directed central opening therein;
   an upper enclosing member of the structure comprising the top cover for the second plurality of air passages, said top cover being of a material substantially transparent to short wave components of solar radiation and permitting said short wave components to substantially reach the black body;
   a radial flow turbine operatively disposed in the central opening substantially adjacent to the first plurality of air passages;
   an axial flow turbine operatively disposed in the central opening relative to the second plurality of air passages, whereby ambient wind is directed to drive the radial flow turbine by the first plurality of air passages, ambient wind is directed to drive the axial flow turbine by the second plurality of air passages, whereby ambient wind having passed through the radial flow turbine assists in driving the axial flow turbine, and whereby heat generated in the black body as a result of absorption of solar radiation assists in the flow of ambient wind through the second plurality of air passages to drive the axial flow turbine.

15. The invention of claim 14 wherein the radial flow turbine and the axial flow turbine are mounted on a single rotating shaft, said shaft being interconnected with a generator for producing electric power.

16. The invention of claim 14 wherein the black body comprises a multitude of used rubber tires.

17. The invention of claim 14 wherein the axial flow turbine and the radial flow turbine are operatively connected to drive a first generator to produce electric power.

18. The invention of claim 17 further comprising an auxiliary fossil fuel powered prime mover operatively connected with a second generator to drive the same, and a sensing and regulating means for sensing the electric power output of the first generator and for regulating the output of the prime mover to generate sufficient power in said second generator to maintain a predetermined minimum combined output of power of the first and second generators regardless of variations of the power output of the first generator.

19. The invention of claim 18 wherein the prime mover is a diesel engine.

20. The invention of claim 18 wherein the radial flow turbine and the axial flow turbine are mounted on a single rotating shaft which is operatively connected to the first generator.

* * * * *